(12) United States Patent
Nguyen et al.

(10) Patent No.: US 10,649,964 B2
(45) Date of Patent: May 12, 2020

(54) INCORPORATING EXTERNAL DATA INTO A DATABASE SCHEMA

(71) Applicant: Red Hat, Inc., Raleigh, NC (US)

(72) Inventors: Filip Nguyen, Brno (CZ); Filip Elias, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 448 days.

(21) Appl. No.: 14/632,756

(22) Filed: Feb. 26, 2015

(65) Prior Publication Data

US 2016/0253361 A1    Sep. 1, 2016

(51) Int. Cl.
*G06F 16/21*    (2019.01)

(52) U.S. Cl.
CPC .................. *G06F 16/213* (2019.01)

(58) Field of Classification Search
None
See application file for complete search history.

(56) References Cited

U.S. PATENT DOCUMENTS

| | | | |
|---|---|---|---|
| 5,555,409 A * | 9/1996 | Leenstra, Sr. | G06F 17/30958 |
| 5,701,461 A | 12/1997 | Dalal et al. | |
| 6,457,003 B1 | 9/2002 | Gajda et al. | |
| 7,386,563 B1 | 6/2008 | Pal | |
| 7,395,258 B2 | 7/2008 | Altinel et al. | |
| 7,702,649 B1 | 4/2010 | Bresch et al. | |
| 8,543,588 B2 | 9/2013 | Dettinger et al. | |
| 2003/0187850 A1 | 10/2003 | Reed et al. | |
| 2006/0123229 A1 * | 6/2006 | Holloway | G06F 21/6227 713/164 |
| 2007/0294307 A1 * | 12/2007 | Chen | G06F 17/30312 |
| 2010/0106739 A1 * | 4/2010 | Daehlin Lehre | G06F 17/30306 707/769 |
| 2011/0314047 A1 * | 12/2011 | Koronthaly | G06F 17/3048 707/769 |
| 2012/0239612 A1 * | 9/2012 | George | G06F 16/254 707/602 |
| 2014/0129718 A1 * | 5/2014 | Ono | H04L 47/76 709/226 |

(Continued)

OTHER PUBLICATIONS

Milena Ivanova; Data Vaults: a Datanase Welcome to Scientific File Repositories; ACM; 2013; pp. 1-4 (Year: 2013).*

(Continued)

*Primary Examiner* — Jeff A Burke
*Assistant Examiner* — Jermaine A Mincey
(74) *Attorney, Agent, or Firm* — K&L Gates LLP

(57) ABSTRACT

Various examples are directed to systems and methods for managing a database to include data from an external data source. A database engine may receive a request to add a reference column to a database described by a database schema. The request may comprise a location parameter describing a location of the external data source comprising data for populating the reference column and a data identifying parameter describing data at the external data source for populating the reference column. The database engine may modify the database schema to include the reference column, send a query to the external data source to obtain at least one data item for populating the reference column, and populate the reference column with the at least one data item.

19 Claims, 5 Drawing Sheets

(56) References Cited

U.S. PATENT DOCUMENTS

2014/0279838 A1* 9/2014 Tsirogiannis ......... G06F 16/211
707/603
2014/0317084 A1* 10/2014 Chaudhry ........... G06F 17/3048
707/713

OTHER PUBLICATIONS

"Object Reference Column in a SqlCe Data Table," May 2014, accessed from https://social.msdn.microsoft.com/Forums/sqlserver/en-US/75c59ff6-1b85-4b24-b281-9e95fc9f3d29/obiect-reference-column-in-a-sqlce-data-table?forum=sqlce, on or before Jan. 16, 2015.

"Accessing SQL Databases, 4 of 5," 1999, accessed from http://www.csee.umbc.edu/portal/help/oracle8/server.815/a66736/ch63.htm, on or before Jan. 16, 2015.

Altinel, et al., "Cache Tables: Paving the Way for an Adaptive Database Cache," IBM Almaden Research Center, 650 Harry Road, San Jose, CA 95120; Comp. Sci. Div, Dept EECS, UC Berkeley, Berkeley, CA 94720, 2003, accessed from http://www.vldb.org/conf/2003/papers/S22P01.pdf, on or before Jan. 16, 2015.

\* cited by examiner

INCORPORATING EXTERNAL DATA INTO A DATABASE SCHEMA

BACKGROUND

Databases play an increasingly important role in modern life and business. Businesses have come to use databases in any number of different contexts. Human resource departments use databases to store data describing employees, including, compensation information, address information, etc. Sales and marketing departments use customer relationship management (CRM) databases to store data describing customers including, for example, purchases, product preferences, etc. Information technology (IT) departments use databases for many purposes including, for example, storing data describing computer devices, software applications, etc. Consumers too are becoming increasingly dependent on databases. For example, a typical computer device user may use a media application that maintains a database of available media files, a calendar or e-mail application that maintains a database of personal and/or business contacts, a financial application that maintains a database of financial records, and others.

Many modern users need to access data from across multiple different data sources. There are existing methods for aggregating data across multiple sources. These existing methods, however, can be bulky and inefficient. For example, a federation engine can act as an intermediary between clients and multiple data sources. Clients direct queries to the federation engine, which then separately queries the data sources each implicated data source. The federation engine creates and sends a response to the client queries. Thick clients are also used to supplement data from a database. A thick client is configured to independently communicate with multiple data sources. The received data is then aggregated on the client-side.

SUMMARY

Various examples are directed to systems and methods for managing a database to include data from an external data source. A database engine may receive a request to add a reference column to a database described by a database schema. The request may comprise a location parameter describing a location of the external data source comprising data for populating the reference column and a data identifying parameter describing data at the external data source for populating the reference column. The database engine may modify the database schema to include the reference column, send a query to the external data source to obtain at least one data item for populating the reference column, and populate the reference column with the at least one data item.

In some examples, the database engine may receive from a client a query. The query may identify a data item from a table included in a database schema. The database engine may determine that the data item identified by the query corresponds to a reference column of the table. The reference column may comprise a pointer to an external data source and a data identifying parameter describing a value for the data item stored at the external data source. The database engine may send a request to the external data source, wherein the request comprises an indication of the data identifying parameter, receiving a reply from the external data source; and returning to the client a reply, wherein the reply confirms that the query has been serviced.

FIGURES

Various example embodiments are described herein in conjunction with the following figures, wherein.

DESCRIPTION

Various example embodiments are directed to systems and methods for incorporating external data into a database schema using a database engine. For example, the database engine may be programmed to incorporate a reference column into a table of the database schema. The reference column may include a pointer or other reference to an external data source where data items for populating the reference column may be found. To respond to queries that read or write to data items of a reference column, the database engine may be programmed to retrieve data items from an external data source or sources and populate the tables with the retrieved data items. This may be done on demand as queries are made, or as a periodic cache process.

Reference will now be made in detail to several example embodiments, examples of which are illustrated in the accompanying figures. Wherever practical, similar or like reference numbers may be used in the figures and may indicate similar or like functionality. The figures depict examples of the disclosed systems (or methods) for purposes of illustration only. One skilled in the art will readily recognize from the following description that alternative examples of the structures and methods illustrated herein may be employed without departing from the principles described herein.

Figure 1:
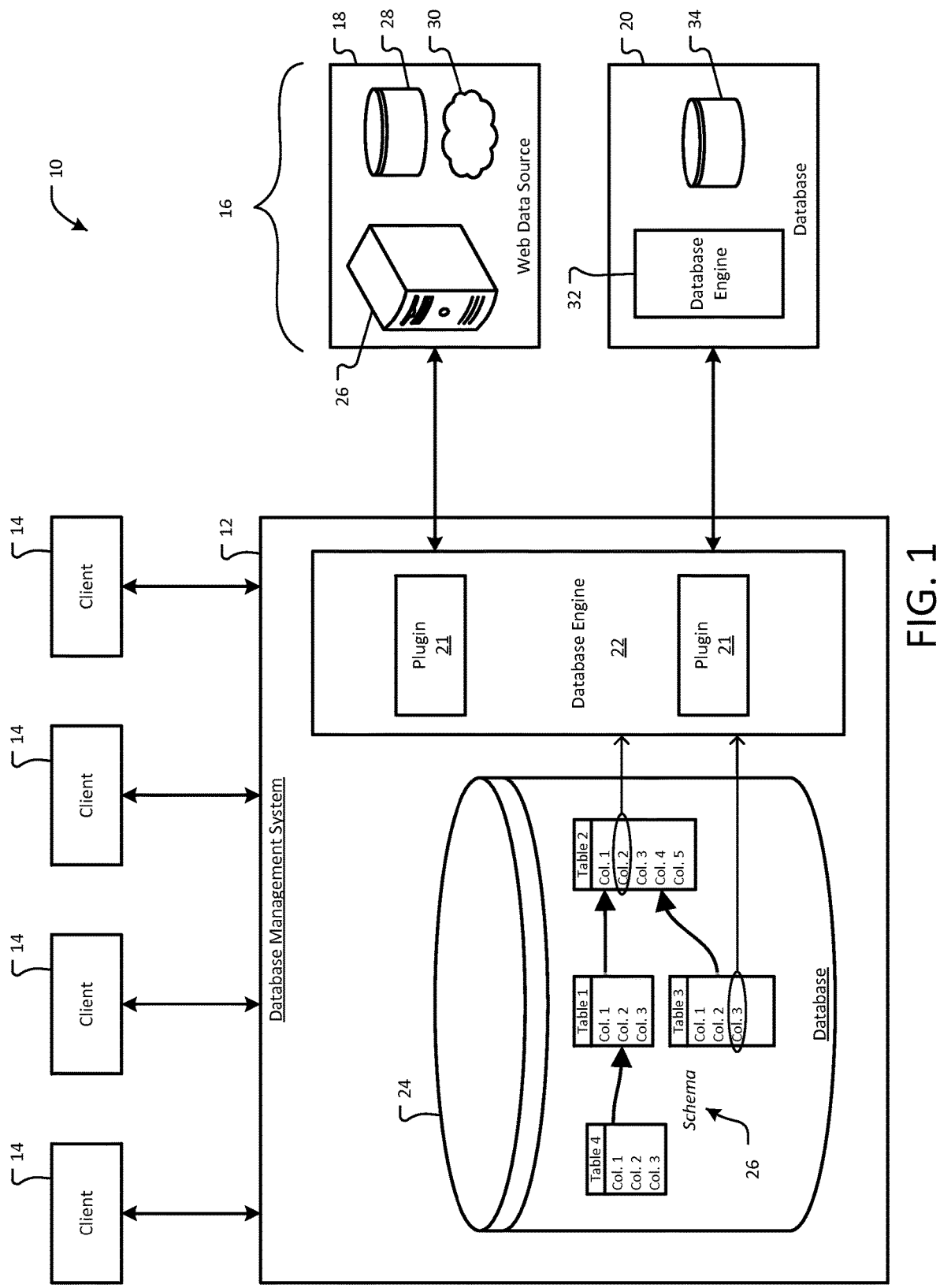
FIG. 1 is a diagram showing one example of an environment for incorporating external data into a database schema.

FIG. 1 is a diagram showing one example of an environment for incorporating external data into a database schema. The environment 10 comprises a database management system 12, one or more clients 14 and one or more external data sources 16. The database management system 12 may comprise a database 24 and a database engine 22. The database engine 22 may be a software application that facilitates interaction between the database 24 and other components of the environment 10. For example, the database engine 22 may have an associated data definition language describing commands that may be executed to interact with the database. Examples of suitable database engines include MySQL, MariaDB, PostgreSQL, SQLite, Microsoft SQL Server available from the MICROSOFT CORPORATION, various DBMS's available from ORACLE CORPORATION, various DBMS's available from SAP AG, IBM DB2, available from THE INTERNATIONAL BUSINESS MACHINES CORPORATION, etc.

The database 24 may comprise a plurality of data items logically organized according to a schema 26. The schema 26 may describe logical relationships between the data items of the database base 24 in terms of related database objects such as, tables, indices, etc. Each table may comprise data items organized into rows and columns. The columns in a table may describe a data category or type. Each row may comprise a set of data items, with each data item in a row corresponds to one of the columns of the table. The example schema 22 shown in FIG. 1 includes four example tables labeled Table 1, Table 2, Table 3, and Table 4. Each table has a set of columns, as indicated. It will be appreciated, however, that the systems and methods described herein may be utilized with schemas including different numbers and combinations of tables, columns, indices, etc.

Clients 14 may be any suitable applications that direct queries or other requests to the database management system 12. Clients 14 may be executed on any suitable computing device or devices. In some examples, one or more clients 14 may be executed on the same computing device or devices as other components of the environment 10 such as, for example, the database engine and/or an external data source 16. In some examples, one or more clients 14 may be executed on stand-alone computing devices that are not part of any other components of the environment 10. The database management system 12 (e.g., the database engine 22 thereof) may be in communication with one or more external data sources 16. External data sources 16 may include any data source that is not part of the database management system. For example, some external data sources may comprise a data manager, such a web server or a database engine for managing access to data stored at the external data source 16. The database engine 22 may communicate with the data managers of the various external data sources 16 using any suitable application program interface (API) or other suitable communications protocol such as, for example, Simple Object Access Protocol (SOAP), a Representational State Transfer or RESTful protocol, such as the Open Data Protocol or OData, a Structured Query Language or SQL protocol, etc.

Any suitable number and/or type of external data sources 16 may be used. Two examples are shown in FIG. 1. A web data source 18 may comprise a web server 26. The web server 26 may manage data stored at a data store 28 associated with the web server 26. In some examples, in addition or instead of managing data at the data store 28, the web server 26 may manage data stored at a cloud storage system 30. The cloud storage system 30 may be physically embodied as one or more servers and data storage devices in communication with the web server 26 via a network, such as the Internet. The database engine 22 may communicate with the web server 26, for example, according to SOAP, a RESTful protocol, an eXtensible Markup Language (XML) or Hypertext Markup Language (HTML) protocol, etc. An external database 20 may comprise a database engine 32 that manages access to a database 34. For example, the database engine 32 may receive and respond to queries (e.g., queries from the database engine 22). The queries may be structured according to a data definition language such an SQL-based language or any other suitable language.

Optionally, the database engine 22 and the external data sources 16, 20 may communicate utilizing one or more plugins 21 that may be installed to the database engine 22. Plugins may be software components installed to other software components to add functionality. The plugins 21 may facilitate communication between the database engine 22 and the various external data sources 16, 20. In some examples, each external data source 16, 20 or type of external data source 16, 20 may have a dedicated plug-in 21. The plugins 21 may be configured to create a request or query to the external data source according to configured parameters of the plugin 21. The configured parameters may indicate, for example, properties of the database 24, properties of the respective external data sources 16, 20, etc. Some plugins 21 may be included with the database 24. Examples of such plugins 21 may include an Structured Query Language (SQL) plugin 21 that sends requests to external SQL databases. Other plugins 21 may be custom-created, for example, by an administrator of the database 24.

In some examples, queries from the database engine 22 to the external data sources 16, 20 may be aggregated. For example, instead of sending a separate query for each row of data that is to be returned to the database engine 22 (or ultimately a client 14), the database engine 22 may aggregate multiple queries and send the aggregated queries to the appropriate external data source 16, 20 at the same time. In one example according to an SQL format, the database engine 22 (and/or the appropriate plugin 21) may aggregate the following queries:

select phone from users where id=1;
select phone from users where id=2;
select phone from users where id=3;

The queries may be aggregated as a single query:

select phone from users where id is (1, 2, 3).

The various components of the environment 10 may be implemented using any suitable computing devices or combination of computing devices including, for example, servers, data storage devices, etc. The various components of the environment 10 may be in communication with one another via any suitable network including, for example, any suitable type of wired, wireless, and/or mixed network. The network may include, for example, the Internet, a local area network (LAN), a wide area network (WAN), etc.

Figure 2:
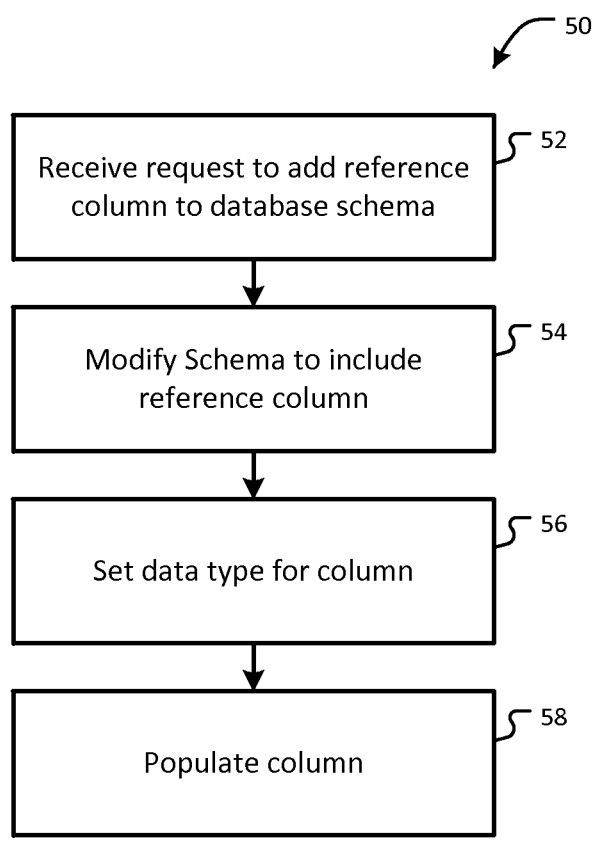
FIG. 2 is a flow chart showing one example of a process flow that may be executed by the database engine to add a reference column to a table in the database schema.

FIG. 2 is a flow chart showing one example of a process flow 50 that may be executed by the database engine 22 to add a reference column to a table in the database schema 26. At 52, the database engine 22 may receive from a client 14 a request to add a reference column to a table of the database schema 26. The request to add a reference column may be of any suitable form. For example, the request may be to add a reference column to an existing table of the schema 26. Such a request may use an ADD command or other suitable command of the data definition language of the database engine 22. Also, in some examples, the request may be to create a new table including a reference column. Such as request may use a CREATE TABLE command or other suitable command of the data definition language of the database engine 22.

The request may indicate that the column to be added is a reference column. It may also include suitable parameters for defining the reference column (e.g., reference column parameters). Example reference column parameters may include, a location parameter for an external data source from which the reference column may be populated, a type parameter indicating the type of the external data source, and at least one parameter for identifying data to be included in the reference column (e.g., a data identifying parameter). The location parameter may be, for example, a Universal Resource Identifier (URI), Universal Resource Locator (URL), or any other indicator or address that identifies an external data source 16 from which the reference column may be populated. The type parameter may indicate a type of the external data source (e.g., web source such as 18, database such as 20, etc.). In some examples, the type parameter may also indicate the protocol to be used in communications between the database engine 22 and the external data source 16. A data identifying parameter or parameters may identify data at the external source that is to be used to populate the reference column. For example, when the external data source 16 is a database, such as 20, data identifying parameters may include a query that may be made to the database 20 to retrieve data for populating the column. When the external data source 16 is a web data source, such as 18, data identifying parameters may include a folder, file or other data organization object. In some examples, reference column parameters may also include caching parameters. Additional reference column parameters may be included such as, for example, credential parameters that permit the database engine 22 to authenticate with the external data source 16, etc.

An example syntax for identifying a reference column is given below:

```
column_name REFERENCE (TYPE, URL, Username, Password,
    Param1, Param2, . . ., Paramn)
```

The name of the reference column is indicated by "column_name." The REFERENCE may indicator that the column to be added is a reference column. Reference column parameters may be listed between the parentheses. TYPE may indicate a type of the external data source 16 from which the reference column is to be populated. The "URL" parameter may provide a Universal Resource Locator (URL) or other suitable location parameter for the remote data source 16. The parameters "Username" and "Password" may be credential parameters and may be utilized, for example, if the external data source 16 requires that the database engine 22 authenticate to gain access to the data. Additional parameters (e.g., "Param1, Param2, . . . , Paramn) may be data identifying parameters or any other suitable parameter.

An example command for creating a table in the schema 26 with a reference column is provided below:

```
CREATE TABLE User (id INT, name VARCHAR(20), address
    VARCHAR (12), telephone REFERENCE (REST,
    'http://onlinePhonebook/number', 'guest' , 'guest', name,
    address));
```

The command reproduced above may be directed to the database engine 22 by a client 14 to request the creation of a table called "User." The example table indicated by the above command comprises four columns. A first column "id" may be a key column for the table and comprises a data item that is an integer number. A second column "name" comprises a variable character data item having a size of up to 20 bytes. A third column "address" comprises a variable character data item having up to 12 bytes. A fourth column "telephone" is a reference column that points to an external web data source, such as 18. The syntax "REFERENCE" indicates that the fourth column is a reference column. The reference column parameter "REST" may be a type parameter indicating that the external data source 16 for populating the column may be communicated with utilizing a RESTful protocol. The reference column parameter "http://online-Phonebook/number" may be a location parameter, in this case a URL, pointing to the external data source 16 for populating the column. The reference column parameters "guest" and "guest" may be credential parameters indicating a user name and password that may be used by the database engine 22 to access the external data source 16. The reference column parameters "name" and "address" may be data identifying parameters identifying the data to be used to populate the reference column. In this example, the data identifying parameters point back to other columns in the table "User." For example, when the database engine 22 populates the reference column "telephone" with respect to any given row, it may query the external data source 16 using the values for the "name" and "address" columns from that same row.

At 54, the database engine 22 may modify the schema 26 to include the reference column described by the request. For example, if the request was to create a new table including the reference column, the database engine 22 may create the table at a schema definition (e.g., a file or files that describes the schema 26). If the request was to add a reference column to an existing table of the schema 26, then the schema definition may be modified accordingly. At 56, the database engine 22 may set a data type for the reference column. The data type may be set in any suitable manner. In some examples, the request received at 52 may indicate a type for the data to be included in the column. In other examples, the database engine 22 may contact the outside data source 16 and inquire as to the type of the data. Alternatively, the database engine 22 may populate the column (56) and then set the type of data in the column based on the results returned from the external data source 16. At 58, the database engine 22 may populate the reference column. Populating the reference column may comprise contacting the external data source 16, requesting data items identified by the data identifying parameters, and writing the data to the database 24. For example, the database engine 22 may maintain two versions of the reference column, a reference version and a cache version. The reference version may comprise, for each row in the relevant table, reference column parameters as described herein. The cache version of the reference column may comprise, for each row in the relevant table, a cache value of the data item. Populating the reference column may comprise writing to the cache column data items received from the external data source according to the reference column parameters. In some examples, the database engine 22 may populate the reference column with a single request to the external data source 16. In other examples, the database engine 22 may make separate queries to the external data source 16 to receive data for each row in the table including the reference column.

Reference columns may be populated in any suitable manner. For example, the database engine 22 may populate all or a portion of a reference column when a client 14 makes a query that seeks to either read or write to data items in the reference column. Also, in some examples, the database engine 22 may periodically cache the reference column at the database 24. Periodically caching a reference column may reduce or eliminate the need to query outside data sources 16 in order to service queries from clients 14. In some examples, details of the caching may be provided to the database engine 22 as caching parameters. Caching parameters may include, for example, whether a particular reference column will be cached and a caching period (e.g., how often the column will be cached). Another example caching parameter may indicate time periods when caching is to occur. For example, caching may be set to occur during times where the load on the database 24 is lower (e.g., at night, on weekends, etc.) Caching parameters may be among the reference column parameters provided to the database engine 22 at the time that a reference column is created. In some examples, caching parameters may be set or modified after the creation of a reference column by a client 14 (e.g., the client 14 that requested creation of the reference column) and/or by an administrator of the database management system 12. In some examples, the database engine 22 may use a default set of caching parameters, for example, if none are provided.

Figure 3:
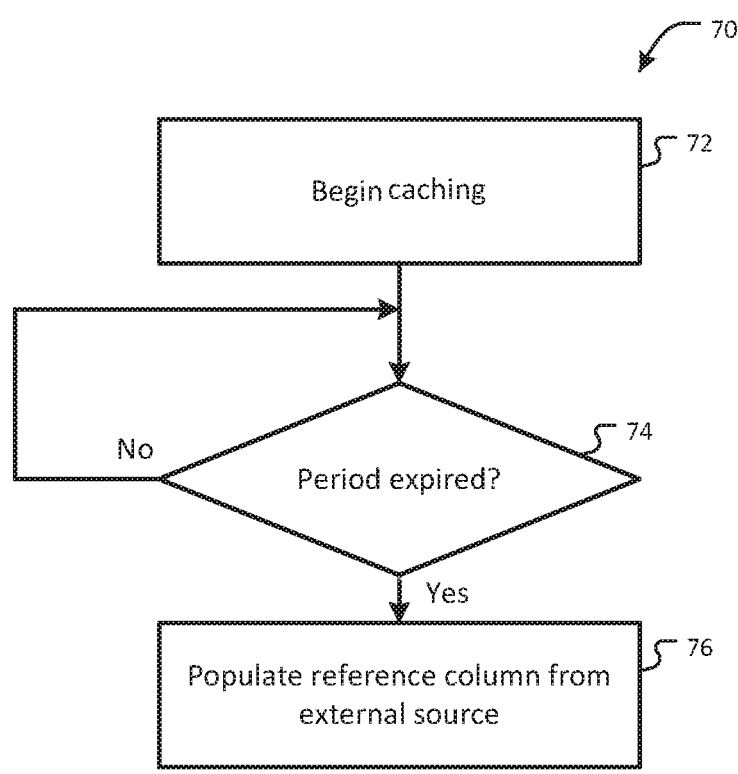
FIG. 3 is a flow chart showing one example of a process flow for periodically caching data items comprising a reference column in the database schema.

FIG. 3 is a flow chart showing one example of a process flow 70 for periodically caching data items comprising a reference column in the database schema 26. At 72, the database engine 22 may begin caching a reference column. The database engine 22 may begin caching a reference column, for example, at the time that the reference column is created and/or at another time designated by caching parameters. At 74, the database engine 22 may determine whether a caching period for the reference column. The caching period may be an indication of how often the reference column is to be cached. The caching period may be, for example, an hour, a day, a week, a month, etc. If the caching period has expired, the database engine 22 may populate the reference column from its indicated external source, at 76.

Figure 4:
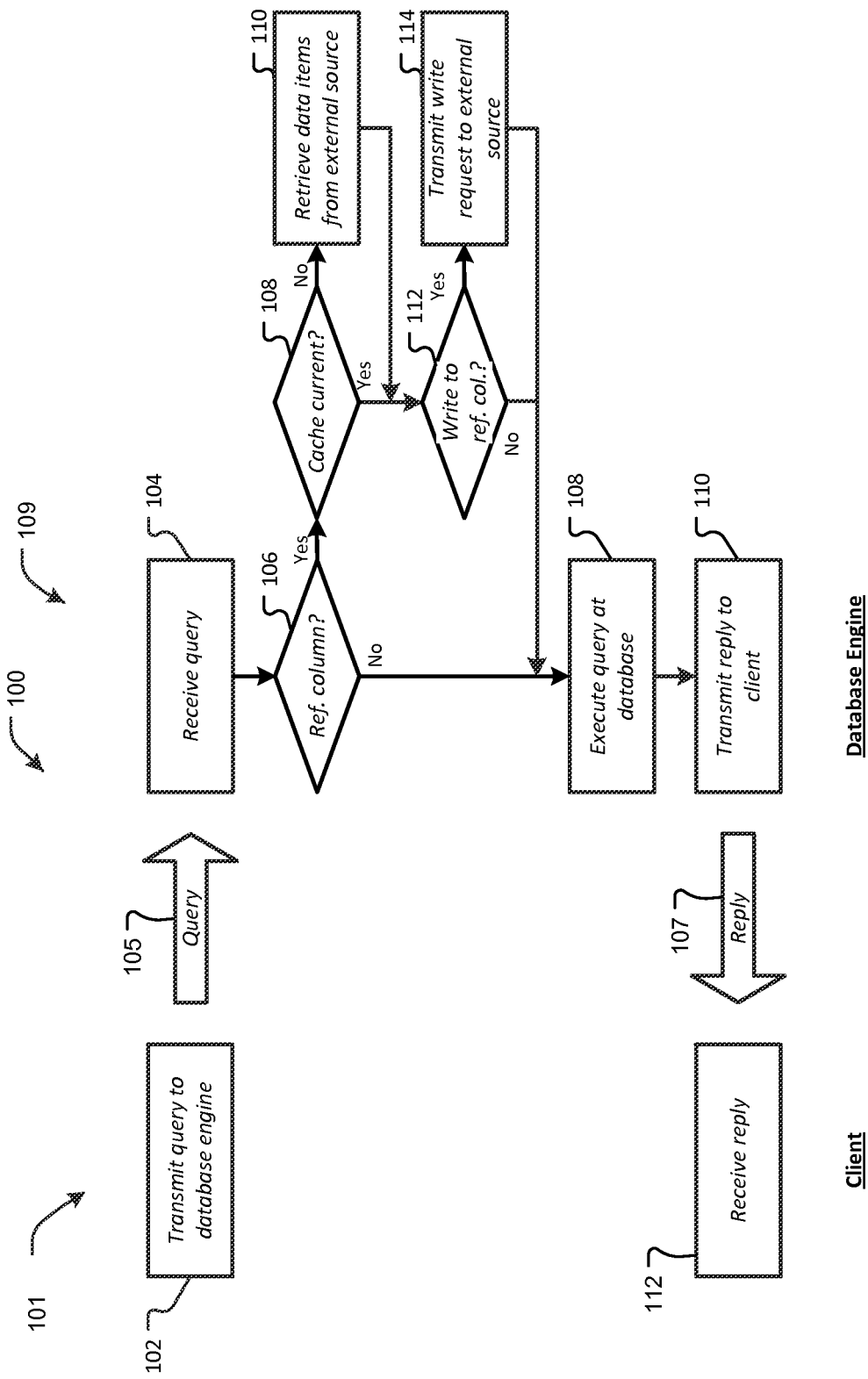
FIG. 4 is a flow chart showing one example of a process flow that may be executed by the database engine in conjunction with an agent to respond to a query to a reference column that is periodically cached.

FIG. 4 is a flow chart showing one example of a process flow 100 that may be executed by the database engine 22 in conjunction with an agent 14 to respond to a query to a reference column that is periodically cached, as described with respect to FIG. 3. The flow chart of FIG. 4 comprises two columns. A first column 101 shows actions that may be executed by a client 14. A second column 103 shows actions that may be executed by the database engine 22. At 102, the client may send a query 105 to the database engine 22. The query 105 may be formatted according to the data definition language used by the database engine 22. The database engine 22 may receive the query 105 at 104. At 106, the database engine 22 may determine whether the query 105 reads or writes to a reference column (e.g., reads or writes to a data item corresponding to a reference column). If not, the database engine 22 may, at 108, execute the query 105 at the database 24. At 110, the database engine 22 may send a reply 107 to the query to the client 14, which may receive the reply 17 at 112.

Referring back to 106, if the query 105 does read or write to a reference column, the database engine 22 may optionally determine, at 108, whether a cache of the reference column is current. The cache of the reference column may be stored at the database 24 as a separate cache column, as described herein. For example, the database engine 22 may determine how much time has passed since the last time that the reference column (or at least the rows of the reference column implicated by the query 105) were cached from the external data source 16. If that time exceeds a cache threshold, then the database engine 22 may, at 110, retrieve at least one data item for the reference column from the external data source 16. The cache threshold may be the caching period, for example, as described above at 74. In some examples, the cache threshold may be query-specific and may be, for example, indicated by the query 105.

If the cache of the reference column is current (or has been made current at 110), the database engine 22 may determine, at 112, whether the query 105 requests to write to a data item included in the reference column. If yes, then the database engine 22 may implement the write at 114 by sending a write request to the external data source 16. In some examples, instead of sending the write request immediately, the database engine 22 may store an indication of the write request to be sent at a later time, for example, as part of a batch process. If the query 105 does not include a request to write to a data item included in the reference column, or the request is dealt with, the database engine 22 may, at 108, execute the query 105 from the cached version of the reference column and then proceed to 110 as described above.

Figure 5:
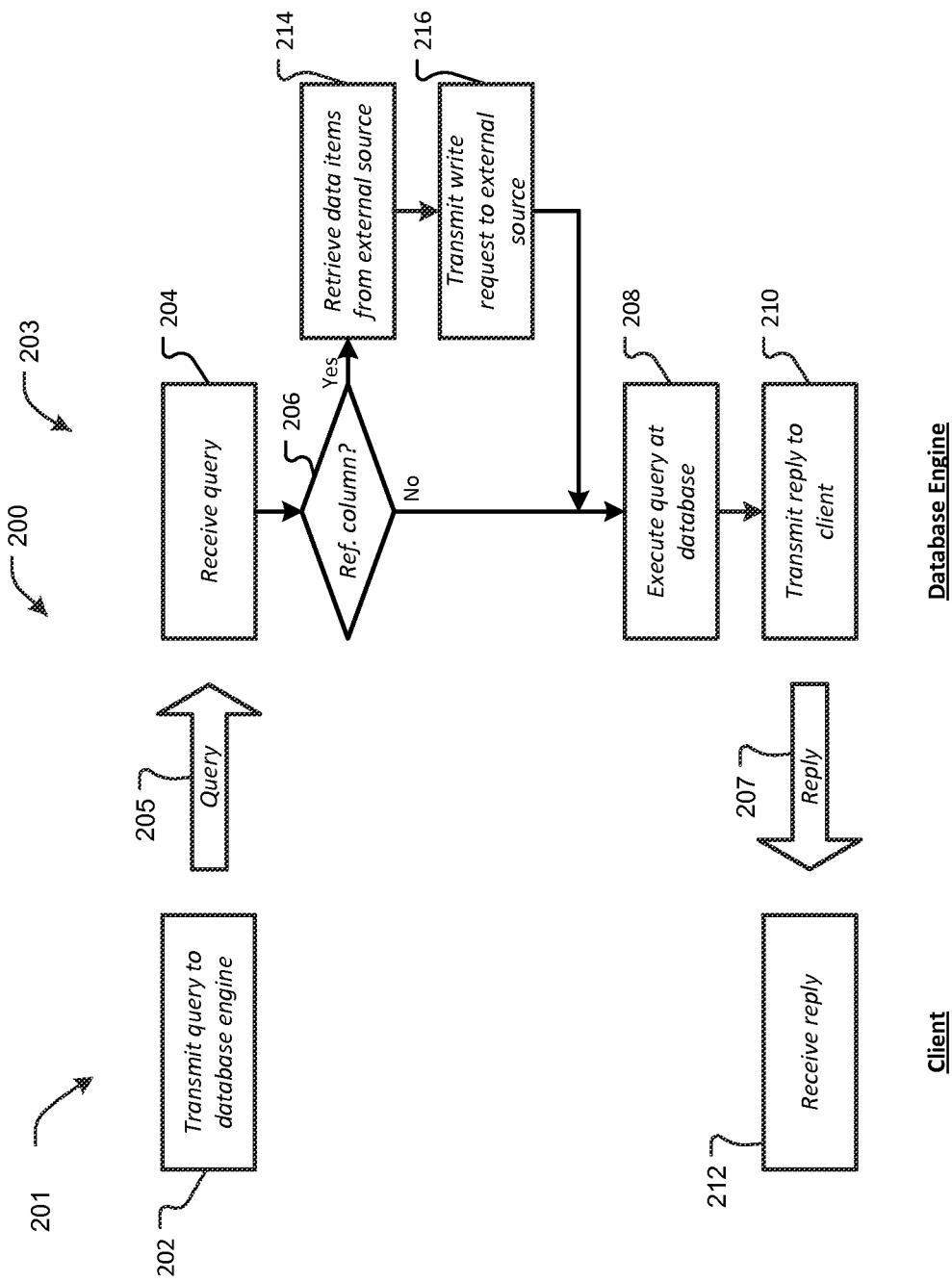
FIG. 5 is a flow chart showing one example of a process flow that may be executed by the database engine in conjunction with an agent to respond to a query to a reference column that is populated when queried.

FIG. 5 is a flow chart showing one example of a process flow 200 that may be executed by the database engine 22 in conjunction with an agent to respond to a query to a reference column that is populated when queried. The flow chart of FIG. 5 comprises two columns. A first column 201 shows actions that may be executed by a client 14. A second column 203 shows actions that may be executed by the database engine 22. At 202, the client may send a query 205 to the database engine 22. The query 205 may be formatted according to the data definition language used by the database engine 22. The database engine 22 may receive the query 205 at 204. At 206, the database engine 22 may determine whether the query 205 reads or writes to a reference column. If not, the database engine 22 may, at 208, execute the query 205 at the database 24. At 210, the database engine 22 may send a reply 207 to the query to the client 14, which may receive the reply 17 at 212.

Referring back to 206, if the query 205 does read or write to a reference column, the database engine 22 may, at 214, retrieve at least one data item for the reference column from the external data source 16. If the query 205 requested a write to any data items in the reference column, the database engine 22 may send a write request to the external source at 216 in a manner similar to that described above with respect to 114. For example, the write request may be sent at the time that the query is processed or may be delayed for batch processing and/or until a time when traffic from the database engine 22 and/or to the external data source 22 is expected to be less. The database engine 22 may proceed to 208, as described above.

Reference in the specification to, "examples," "various examples," "some examples," etc. means that a particular feature, structure, or characteristic described in connection with the examples is included in at least one embodiment of the invention. The appearances of the above-referenced phrases in various places in the specification are not necessarily all referring to the same embodiment. Reference to examples is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of examples of the present disclosure have been simplified to illustrate elements that are relevant for a clear understanding of the present disclosure, while eliminating, for purposes of clarity, other elements, such as, for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as, for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It can be appreciated that, in some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. It can be appreciated that such examples are intended primarily for purposes of illustration. No particular aspect or aspects of the example method, product, computer-readable media, and/or system examples described herein are intended to limit the scope of the present disclosure.

It will be appreciated that the various components of the environment 100 may be and/or be executed by any suitable type of computing device including, for example, desktop computers, laptop computers, mobile phones, palm top computers, personal digital assistants (PDA's), etc. As used herein, a "computer," "computer system," "computer device," or "computing device," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of a method. It should be noted that the process steps and instructions of the present disclosure can be embodied in software, firmware or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. It will be appreciated that a variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

We claim:

1. A system for managing a database containing data organized with a logical table structure described by a database schema to include data from an external data source, the system comprising:
at least one processor and an operatively associated computer-readable-medium, wherein the at least one processor is programmed to execute a database engine, and wherein the database engine is configured to:
receive a request to add a reference column to a preexisting internal table included in the database, wherein the request comprises:
a type parameter describing a type of an external data source;
a location parameter describing a location of the external data source comprising data for populating a cache column associated with the reference column;
a credential parameter for accessing the data at the external data source; and
a data identifying parameter describing data at the external data source for populating the associated cache column;
responsive to the request, modify the database schema to include in the preexisting internal table the reference column and the associated cache column;
store the type parameter, the location parameter, the credential parameter, and the data identifying parameter as parameters in the reference column;
send a query including the parameters in the reference column to the external data source to obtain a value for at least one data item for populating the associated cache column;
populate the associated cache column in the preexisting internal table included in the database with the value for the at least one data item; and
periodically update the associated cache column with the query including the parameters in the reference column.

2. The system of claim 1, wherein the data identifying parameter comprises a description of the query.

3. The system of claim 1, wherein the database engine is further configured to set a data type for the reference column based on the value for the at least one data item.

4. The system of claim 1, wherein populating the cache column comprises populating the associated cache column in response to a query from a client requesting an operation on a data item corresponding to at least one of the reference and the associated cache column.

5. The system of claim 1, wherein populating the cache column comprises periodically populating the cache column.

6. A system for managing a database containing data organized with a logical table structure described by a database schema to include data from an external data source, the system comprising:
at least one processor and an operatively-associated computer-readable-medium, wherein the at least one processor is programmed to execute a database engine, and wherein the database engine is configured to:
receive a request to add a reference column to a preexisting internal table included in the database, wherein the request comprises:
a location parameter describing a location of the external data source comprising the further data for populating a cache column associated with the reference column; and
a data identifying parameter describing the further data at the external data source for populating the cache column associated with reference column;
responsive to the request, modify the database schema to include the reference column and the associated cache column in the preexisting internal table;
store the location parameter and the data identifying parameter as parameters in the reference column;
send a query including the parameters in the reference column to the external data source to obtain at least one data item for populating the associated cache column; and
populate the associated cache column in the preexisting internal table included in the database with the at least one data item; and
periodically update the associated cache column with the query including the parameters in the reference column.

7. The system of claim 6, wherein the external data source is selected from the group consisting of a database and a web server.

8. The system of claim 6, wherein the request comprises a type parameter describing a type of an external data source.

9. The system of claim 6, wherein the request comprises a credential parameter for accessing the data at the external data source.

10. The system of claim 9, wherein the credential parameter comprises a user name and a password.

11. The system of claim 6, wherein the data identifying parameter comprises a description of the query.

12. The system of claim 6, wherein the data identifying parameter comprises a reference to a second column of the table comprising the reference column.

13. A system for managing a database, the system comprising:
at least one processor and an operatively-associated computer-readable-medium, wherein the at least one processor is programmed to execute a database engine, the database engine is configured to manage a database containing data organized with a logical table structure described by a database schema, the data including data from a source outside the database, the logical table structure including an internal table having a reference column and a cache column associated with the reference column, the reference column comprising a pointer to an external data source and a data identifying parameter describing a value for the data item stored at the external data source, the cache column including data item values retrieved from the external source identified by the reference column, and wherein the database engine is further configured to:
receive from a client a query, wherein the query identifies a data item from the internal table included in the database schema;
determine that the data item identified by the query corresponds to the reference column of the table included in the database,
send a request to the external data source, wherein the request comprises an indication of the data identifying parameter and obtains the value for the data item for populating the associated cache column;

receive a reply from the external data source, wherein the reply includes the value for the data item;

populate the associated cache column of the table included in the database with the value for the data item; and return to the client a reply, wherein the reply confirms that the query has been serviced.

14. The system of claim 13, wherein the query requests a write operation to the data item, wherein the request to the external data source comprises a request to write the value for the data item to the external data source.

15. The system of claim 13, wherein the query requests that the at least one data item be read.

16. The system of claim 15, wherein the database engine is further configured to determine that the associated cache column has not been updated for a threshold period, wherein the request comprises requesting to read the value for the data item.

17. The system of claim 16, wherein the query comprises an indication of the threshold period.

18. The system of claim 13, wherein the request is sent in response to determining that the data item identified by the query corresponds to the reference column.

19. The system of claim 1, wherein the location parameter includes a universal resource locator.

* * * * *